United States Patent [19]

Prewo

[11] 4,111,606
[45] Sep. 5, 1978

[54] COMPOSITE ROTOR BLADE

[75] Inventor: Karl Michael Prewo, Vernon, Conn.

[73] Assignee: United Technologies Corporation, Hartford, Conn.

[21] Appl. No.: 754,668

[22] Filed: Dec. 27, 1976

[51] Int. Cl.² .............................................. F01D 5/14
[52] U.S. Cl. ................................ 416/224; 416/230; 416/241 A
[58] Field of Search ................... 416/229, 230, 241 A, 416/229 A, 224

[56] References Cited

U.S. PATENT DOCUMENTS

| 3,572,971 | 3/1971 | Seiwert | 416/230 |
| 3,600,103 | 8/1971 | Gray et al. | 416/230 |
| 3,679,324 | 7/1972 | Stargardter | 416/230 X |
| 3,699,623 | 10/1972 | Kreider | 416/224 X |
| 3,731,360 | 5/1973 | Stone | 416/229 A X |
| 3,737,250 | 6/1973 | Pilpel et al. | 416/241 A X |
| 3,752,600 | 8/1973 | Walsh et al. | 416/230 X |
| 3,756,745 | 9/1973 | Alver et al. | 416/241 A X |
| 3,762,835 | 10/1973 | Carlson et al. | 416/230 X |
| 3,883,267 | 5/1975 | Baudier et al. | 416/241 A X |
| 3,886,647 | 6/1975 | Alexander | 416/224 X |
| 3,942,231 | 3/1976 | Whitaker | 416/230 X |
| 4,000,956 | 1/1977 | Carlson et al. | 416/241 A X |
| 4,006,999 | 2/1977 | Brantley et al. | 416/230 X |
| 4,022,547 | 5/1977 | Stanley | 416/230 |
| 4,043,703 | 8/1977 | Carlson | 416/230 |
| 4,051,289 | 9/1977 | Adamson | 416/241 A |

FOREIGN PATENT DOCUMENTS 1,328,167  8/1973  United Kingdom ............... 416/241 A Primary Examiner—Everette A. Powell, Jr.
Attorney, Agent, or Firm—Robert C. Walker

[57] ABSTRACT

A compressor rotor blade for a turbomachine is disclosed. Techniques for increasing the strength to weight ratio of the blade while maintaining adequate resistance to foreign object damage are developed. In one specific embodiment an all composite construction employs matrix materials of varied ductilities and yield strengths to improve the energy absorbing capabilities of the blade.

11 Claims, 5 Drawing Figures

U.S. Patent    Sept. 5, 1978    4,111,606
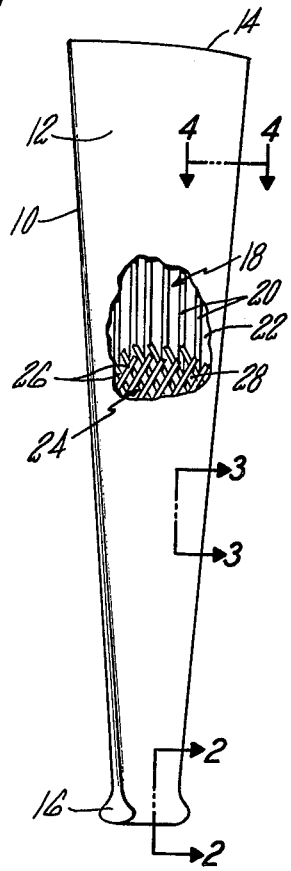
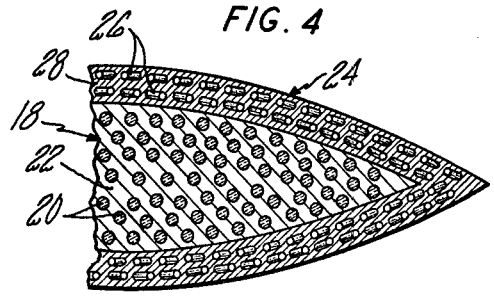
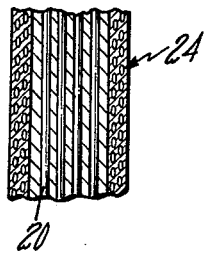
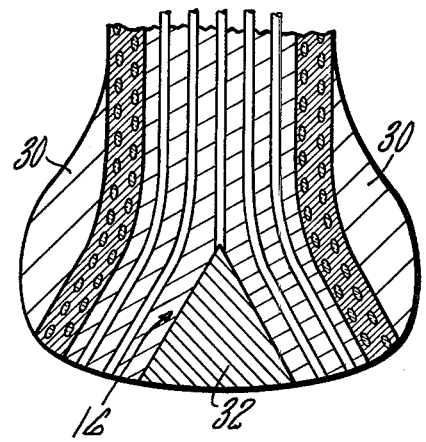
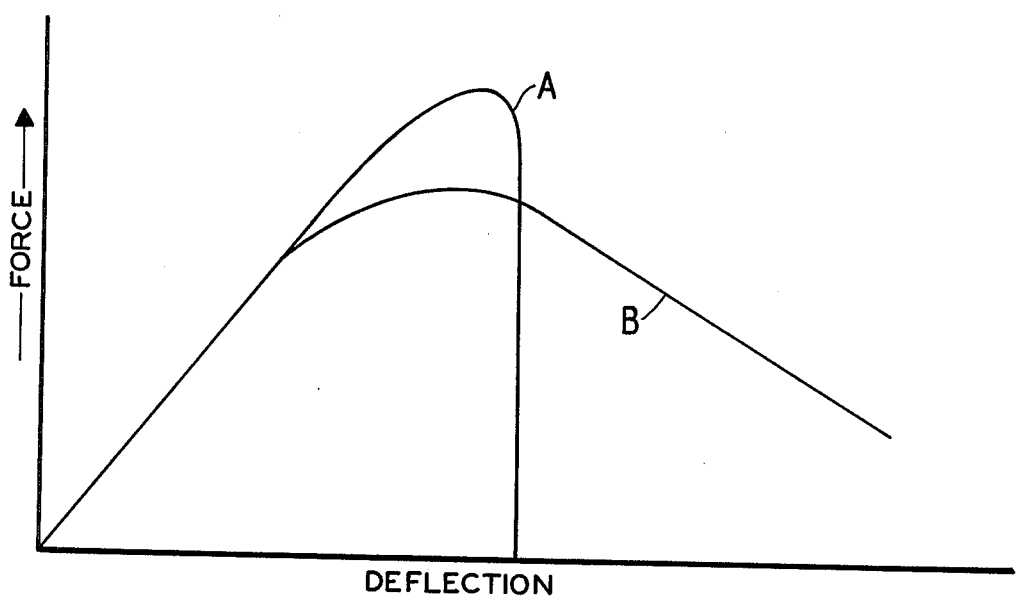

COMPOSITE ROTOR BLADE

BACKGROUND OF THE INVENTION

The Government has rights in this invention pursuant to Contract No. 33615-74-C-5062 awarded by the Department of the Air Force.

FIELD OF THE INVENTION

This invention relates to rotor blades of rotary machines and, particularly, to blades formed of high strength, high modulus fibers embedded in a matrix material.

DESCRIPTION OF THE PRIOR ART

The operational characteristics and desired attributes of rotor blading are well understood by scientists and engineers working in the turbomachinery field. Against this background very substantial research efforts continue to be applied to the development of material systems which will enhance the desired attributes of blades in their operational environment.

One desired characteristic is a high strength to weight ratio in the blade system. In recent years the extensive use of titanium has enabled dramatic increases in blade strength to weight ratios when compared to formerly used aluminum and steel. Titanium is now considered to be the state of the art material for most compressor blade applications.

Composite materials formed of high strength, high modulus fibers embedded in a matrix material have for the last decade held great promise for future dramatic increases in strength to weight ratios. Unfortunately, however, composite blades have, heretofore, had a notoriously low tolerance to foreign object damage. Developed systems, such as those shown in typical prior art U.S. Pat. Nos. 3,098,723 to Micks entitled "Novel Structural Composite Material"; 3,572,971 to Seiwert entitled "Light weight Turbo-Machinery Blading"; 3,649,425 to Alexander entitled "Arcuate Shaped Composites of Refractory Tapes Embedded in a Metal Matrix"; 3,699,623 to Kreider entitled "Method for Fabricating Corrosion Resistant Composites"; and 3,762,835 to Carlson et al entitled "Foreign Object Damage Protection for Compressor Blades and Other Structures and Related Methods", encase the composite core material in a more ductile, all metallic sheath to improve resistance of the composite structure to foreign object damage.

Further improvements enhancing the survivability of composite blades and enhancing manufacturability of composite blades are required before full utility in turbomachines can be realized.

SUMMARY OF THE INVENTION

A primary aim of the present invention is to adapt composite material technology to compressor rotor blades in an embodiment having adequate resistance to foreign object damage. Improved energy absorbing capabilities are desired and, in at least one embodiment, an all composite airfoil section is sought.

According to the present invention a rotor blade is formed of a core of high strength, high modulus fibers embedded in a first matrix material and a sheath of high strength, high modulus fibers embedded in a second matrix material wherein said first matrix material has a lower yield strength and greater ductility than said second matrix material.

A primary feature of the present invention is the core of spanwise extending fibers which are embedded in the first matrix material. Another feature is the sheath of bias oriented fibers which are embedded in a second matrix material. The first matrix material has a lower yield strength than the second matrix material and is more ductile. In one embodiment the core of spanwise extending fibers and the sheath of biased fibers extend into the root region of the blade and are bracketed by a pair of metallic root blocks. In at least one embodiment, the sheath extends from the root only partially across the span of the blade.

A principal advantage of the present invention is the increased strength to weight ratios made possible by the use of lightweight composite materials. Improved resistance to foreign object damage and reduced susceptibility to catastrophic failure are properties exhibited by the combined composite structure. Torsional strength and root attachment strength in the composite structure are maintained while improving the energy absorption characteristics of the blade. Manufacturability is improved through the avoidance of metallic sheaths in the all composite airfoil embodiments of the present invention.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 1 is a simplified illustration of a compressor rotor blade;

FIG. 2 is a sectional view taken along the line 2—2 as shown in FIG. 1;

FIG. 3 is a sectional view taken along the line 3—3 as shown in FIG. 1;

FIG. 4 is a sectional view taken along the line 4—4 as shown in FIG. 1; and

FIG. 5 is a graph showing the energy absorption characteristics of materials having differing yield strengths.

DESCRIPTION OF THE PREFERRED EMBODIMENT

A rotor blade, such as the fan blade 10 of a gas turbine engine, is illustrated in FIG. 1. The blade has an airfoil section 12 including a tip 14 and a root section 16. The airfoil section is comprised of a spanwise extending core 18 of continuous fibers 20 which are embedded in a first matrix material 22, and a sheath 24 of bias oriented fibers 26 which are embedded in a second matrix material 28. The fibers of the core and the fibers of the sheath, in one embodiment, illustrated by FIG. 2, extend into the root section 16 of the blade. A pair of metallic root blocks 30 bracket the fibers of the core and the sheath in the root region. A metallic wedge 32 displaces the fibers against the root blocks to hold the core and sheath in the assembly.

In the FIG. 1 embodiment the sheath 24 of the bias oriented fibers 26 extends from the root only partially across the span of the blade. In an alternate embodiment the sheath extends from the root over the full span of the blade.

Fiber reinforced composites are particularly desirable for rotor blading due to inherent properties of high specific strength and high specific elastic modulus. The fibers of the spanwise extending core 18 run substantially parallel to the centrifugally generated forces imposed upon the blade. An excellent spanwise strength to weight ratio results and the overall weight of the blade system is reduced. As illustrated the fibers of the sheath 24 are bias oriented with respect to the fibers of the core 18. Biasing the fibers improves the torsional rigidity of the structure and is preferred in most embodiments.

The fibers of the core and the fibers of the sheath extend into the root of the blade. The fibers are held between the root blocks 30 and the wedge 32. The sheath of fibers in one embodiment extends from the root over only a portion of the span of the blade. The percentage of the span covered in each embodiment depends predominantly upon the degree of torsional rigidity required and the location and magnitude of foreign object impact anticipated.

The matrix material in which the spanwise extending fibers are embedded has comparatively low yield strength and the resultant composite has high ductility. This composite combination has good tolerance of foreign object impact. At impact material deformation occurs with only a limited likelihood of catastrophic fracture. The energy of impact is absorbed by plastic deformation of the composite material and the blade remains intact.

One series of laboratory tests displays the relative absorption characteristics of similar composite structures having different aluminum alloy matrix materials. The specimens tested were boron fiber reinforced bars of identical cross section. The specimens were subjected to impact in three point bend tests with the direction of impact being perpendicular to the fiber orientation. The test simulates the impact of a foreign object against the spanwise extending core of a rotor blade. The maximum load sustained at impact ($P_{MAX}$) and the overall energy dissipated before fracture ($E_{TOTAL}$) were measured with the results reported below.

| MATRIX ALLOY | $P_{MAX}$ (lbs) | $E_{TOTAL}$ (ft/lbs) |
|---|---|---|
| 2024 (high yield strength matrix) | 2500 | 10 |
| 1100 (low yield strength matrix | 1800 | >24 (did not fracture) |

The low yield strength specimen deformed out of three point support without fracturing and, therefore, without reaching its energy absorption limit.

Energy absorption may be more fully understood by viewing FIG. 4. The amount of energy absorbed by a specimen is represented by the area under the appropriate curve, curve A for a high yield strength material and curve B for a low yield strength material. The specimen of curve A has fractured and no further energy may be absorbed. The specimen of curve B, however, continues to deform and continues to absorb energy.

Energy absorption at impact without catastrophic fracture is desired in a blade system and, therefore, a low yield strength, ductile matrix material, such as aluminum alloy 1100, is selected for support of the spanwise fibers of the core 18. Unfortunately, the low yield strength matrix offers little torsional resistance to deformation and low tolerance of centrifugally generated loads in the root. The blade tends to untwist after continued use at operating temperatures and the aerodynamic capabilities of the system are adversely affected.

A higher yield strength and comparatively lower ductility matrix material is selected for support of the fibers 26 in the sheath 24. The higher yield strength matrix material in combination with bias oriented fibers described herein exhibits good resistance to torsional deformation and good root strength.

The all composite airfoil of the present invention avoids the metallic sheath structures of the prior art and avoids the manufacturing problems associated therewith. The blade of the present invention may be formed of a multiplicity of tape plies, oriented as described herein and compacted in a single process to form both core and sheath. The use of these similar and highly compatible materials as described offers substantial ease of manufacturability.

Although aluminum alloy matrix systems and boron fibers are described herein, the principle of combined matrix systems for improved energy absorption and strength properties as taught and claimed in this specification is equally applicable to other matrix materials encasing like or differing high strength, high modulus fibers.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A rotor blade structure comprising a root section, and an elongated airfoil section formed of a core of high strength, high modulus fibers embedded in a first matrix material and a sheath of high strength, high modulus fibers embedded in a second matrix material, said first matrix material having a lower yield strength than said second matrix material.

2. The invention according to claim 1 wherein said high strength, high modulus fibers are comprised essentially of boron.

3. The invention according to claim 2 wherein said first matrix material is comprised essentially of aluminum.

4. The invention according to claim 3 wherein said first matrix material is aluminum alloy 1100.

5. The invention according to claim 4 wherein said second matrix material is comprised essentially of aluminum.

6. The invention according to claim 5 wherein said second matrix material is aluminum alloy 2024.

7. The invention according to claim 1 wherein the fibers of said core extend in a spanwise direction through the blade.

8. The invention according to claim 7 wherein the fibers of said sheath are obliquely oriented with respect to said fibers of the core.

9. The invention according to claim 8 wherein said sheath is formed of a plurality of bias oriented plies.

10. The invention according to claim 9 wherein said core of spanwise fibers extends into said root section.

11. The invention according to claim 10 wherein said sheath of fibers extends into said root section.

* * * * *